(12) United States Patent
Munzert

(10) Patent No.: US 10,703,153 B2
(45) Date of Patent: Jul. 7, 2020

(54) AXLE DEVICE FOR THE CONNECTION OF A WHEEL TO THE BODY OF A VEHICLE

(71) Applicant: Dr. Ing. h.c. F. Porsche Aktiengesellschaft, Stuttgart (DE)

(72) Inventor: Andreas Munzert, Gerlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 32 days.

(21) Appl. No.: 16/252,775

(22) Filed: Jan. 21, 2019

(65) Prior Publication Data

US 2019/0225040 A1    Jul. 25, 2019

(30) Foreign Application Priority Data

Jan. 22, 2018 (DE) .................. 10 2018 101 280

(51) Int. Cl.
*B60G 3/20* (2006.01)
*B60G 7/00* (2006.01)
*B60G 15/04* (2006.01)
*B60G 15/06* (2006.01)
*B60G 15/00* (2006.01)

(52) U.S. Cl.
CPC .............. *B60G 3/20* (2013.01); *B60G 7/001* (2013.01); *B60G 15/00* (2013.01); *B60G 15/04* (2013.01); *B60G 15/067* (2013.01); *B60G 2200/18* (2013.01)

(58) Field of Classification Search
CPC ........ B60G 3/20; B60G 15/00; B60G 15/067; B60G 15/04; B60G 7/001; B60G 2200/18; B60G 2204/1482; B60G 3/18
See application file for complete search history.

(56) References Cited

U.S. PATENT DOCUMENTS

| 4,444,415 A | * | 4/1984 | von der Ohe | .......... | B60G 3/202 280/124.144 |
| 4,671,531 A | * | 6/1987 | Sautter | .................. | B60G 3/202 280/124.109 |

(Continued)

FOREIGN PATENT DOCUMENTS

| JP | 2004521826 A | 7/2004 |
| JP | 2005170377 A | 6/2005 |

OTHER PUBLICATIONS

English Translation of the Korean Office Action for Korean Application No. 10-2019-0006126, dated Jan. 21, 2020, 4 pages.

*Primary Examiner* — Drew J Brown
(74) *Attorney, Agent, or Firm* — RatnerPrestia

(57) ABSTRACT

An axle device for the connection of a wheel to the body of a vehicle, having a wheel carrier for the fastening of the wheel, a first link and a second link for force-transmitting connection to the body, which links are both connected to the wheel carrier, furthermore having a supporting link with a carrier portion, which is connected to the wheel carrier, and with a body portion for force-transmitting connection to the body. The supporting link has a spring portion or supporting a spring unit and a damper portion for supporting a damper unit, which spring portion and damper portion are spaced apart from each other in the direction of travel of the body. The body portion has a torsion support portion with fastening freedom in the direction of travel and in the transverse direction of the body and with fastening stiffness in the vertical direction of the body.

10 Claims, 4 Drawing Sheets

(56) References Cited

U.S. PATENT DOCUMENTS

| | | | | |
|---|---|---|---|---|
| 4,930,804 | A * | 6/1990 | Tattermusch | B60G 3/20 280/124.138 |
| 5,685,556 | A * | 11/1997 | Shibue | B60G 3/20 280/124.128 |
| 6,357,772 | B1 * | 3/2002 | Pelz | B60G 3/18 280/124.135 |
| 6,755,429 | B1 * | 6/2004 | Buchwitz | B60G 3/18 280/124.109 |
| 7,048,286 | B2 | 5/2006 | Eppelein | |
| 7,131,653 | B2 * | 11/2006 | Asteggiano | B60G 3/14 280/124.128 |
| 7,243,934 | B2 | 7/2007 | Lee et al. | |
| 7,891,684 | B1 * | 2/2011 | Luttinen | B60G 3/20 280/124.136 |
| 8,678,409 | B2 * | 3/2014 | Koide | B60G 7/008 280/124.135 |
| 2005/0046136 | A1 * | 3/2005 | Sutton | B60G 3/20 280/124.135 |
| 2005/0140110 | A1 * | 6/2005 | Lee | B60G 7/008 280/124.109 |
| 2012/0068431 | A1 * | 3/2012 | Jakob | B60G 3/145 280/124.128 |
| 2015/0183285 | A1 * | 7/2015 | Kettenberger | B60G 7/001 280/124.131 |
| 2015/0191064 | A1 * | 7/2015 | Gielisch | B60G 3/145 280/124.129 |
| 2015/0273963 | A1 * | 10/2015 | Zandbergen | B60G 11/08 280/124.109 |
| 2017/0015173 | A1 * | 1/2017 | Battaglia | B60G 3/18 |
| 2019/0329624 | A1 * | 10/2019 | Nishino | B60G 11/14 |

* cited by examiner

AXLE DEVICE FOR THE CONNECTION OF A WHEEL TO THE BODY OF A VEHICLE

CROSS-REFERENCE TO RELATED APPLICATION

This application claims priority to German Patent Application No. DE 10 2018 101 280.2, filed Jan. 22, 2018, the contents of such application being incorporated by reference herein in their entirety.

FIELD OF THE INVENTION

The present invention relates to an axle device for the connection of a wheel to the body of a vehicle, and to a vehicle with a body with at least two such axle devices on an axle.

BACKGROUND OF THE INVENTION

The present invention deals with axle devices as used in vehicles with individual wheel suspension. The forces acting on the wheels have to be supported in all degrees of freedom. This generally takes place firstly via chassis links which can possibly be provided with active adjustment elements, for example for the steering. Secondly, the forces acting on the wheels are supported via spring-damper units. This serves for increasing comfort, safety and stability. The spring-damper unit can either be designed coaxially, or spring and damper are separated from each other. The individual links serve to predetermine a defined relative movement between the wheel carrier and the body during the inward deflection and during the outward deflection of the wheel. If the spring or the damper is supported on a chassis link, the force introduction point in the case of what are referred to as rod-type links, which each have only one connection point to the body and to the wheel carrier, has to lie on the connecting line between the connection points since said links—unlike triangular or trapezoidal links—cannot support any moments. If spring and damper are supported separately on a rod-type link, this leads to a disadvantage in terms of construction space since both elements have to lie on the line of action of the rod-type link and cannot be arranged offset with respect to the line of action.

It is disadvantageous in the case of the known solutions that, when the spring unit is separated from the damper unit, a relatively large amount of space is necessary in order to arrange same in the region of the axle device and especially to connect them in a force-transmitting manner to a corresponding supporting link. For improved behavior of the spring unit and of the damper unit and therefore for increased safety or improved comfort during movement of the vehicle, the spring unit and the damper unit are customarily arranged offset in the transverse direction of the vehicle. However, this leads to the axle device requiring an increased amount of space in said transverse direction in comparison to combined spring-damper units. In particular, if a luggage compartment or further fixtures, such as, for example, battery devices or electric drive motors, are intended to be installed between two wheel carriers, this increased space requirement of the axle device leads to reduced space possibilities between the wheel carriers or to an increased width of the vehicle.

SUMMARY OF THE INVENTION

The axle device described herein permits separation of the spring unit from the damper unit in a cost-effective and simple manner and at the same time to be able to require a reduced amount of space in the transverse direction.

Features and details which are described in conjunction with the axle device according to aspects of the invention also apply, of course, in conjunction with the vehicle according to aspects of the invention and vice versa in each case, and therefore reference is or can be made constantly from one to the other in respect of the disclosure of the individual aspects of the invention.

According to aspects of the invention, the axle device serves for the connection of a wheel to the body of a vehicle. For this purpose, the axle device has a wheel carrier for the fastening of the wheel. Furthermore, a first link and a second link for force-transmitting connection to the body are provided, which links are both connected to the wheel carrier. Furthermore, a supporting link is provided which is equipped with a carrier portion, which, in turn, is connected to the wheel carrier. The carrier portion has a body portion for force-transmitting connection to the body, wherein the supporting link has a spring portion for supporting a spring unit and a damper portion for supporting a damper unit. The spring portion is spaced apart from the damper portion in the direction of travel of the body, wherein furthermore the body portion has a torsion portion. Said torsion portion is provided with movement freedom in the direction of travel and in the transverse direction of the body, while it has fastening stiffness in the vertical direction of the body.

An axle device according to aspects of the invention for the connection of a wheel to the body of a vehicle is therefore fundamentally based on what are referred to as multi-link systems for the connection of the wheel. These various links serve firstly to ensure a mechanically stable and force-transmitting connection of the wheel carrier to the body. Secondly, such multi-link systems are suitable for permitting or predetermining the movement of the wheel or of the wheel carrier during the inward deflection and during the outward deflection. For this purpose, the individual carriers are connected in a partially force-transmitting, partially articulated manner to the respective component. In known solutions, multi-link systems are known in particular in the form of three-link systems, but also in the form of five-link systems. A solution according to aspects of the invention has at least two links which are additionally provided for the connection to the crucial supporting link.

A crucial concept of the present invention is the correlation of the types of fastening of the supporting link via a torsion support portion in combination with a corresponding spacing between damper portion and spring portion. Reference is made here to a system of coordinates specific to the vehicle and customarily denoted by the coordinate directions x, y and z. These correlate to corresponding orientations of the body, as stated below. The direction of travel of the body corresponds here to the x axis of such a system of coordinates. The transverse direction of the body can be defined transversely with respect to the direction of travel, said transverse direction being oriented perpendicular to the direction of travel and, together therewith, spanning a plane which is oriented parallel or substantially parallel to the carriageway base of the body. Said transverse direction is also referred to as the y axis in the system of coordinates of the vehicle. The vertical direction, which is referred to as the z axis in the system of coordinates for the vehicle, is oriented perpendicular to the x axis and to the y axis and therefore also perpendicularly upward to the direction of travel and to the transverse direction.

According to aspects of the invention, the space required for the axle device is now reduced by the fact that the spring portion and the damper portion are arranged spaced apart from each other in the direction of travel, i.e. in the x direction of the system of coordinates of the vehicle. In addition, it is also possible for the spring portion and the damper portion also to be arranged spaced apart from each other in the y direction, i.e. in the transverse direction of the body. Owing to the fact that a spacing of spring portion and damper portion is provided at least in the direction of travel, a significantly more compact design can be provided, with respect to the orientation in the transverse direction of the axle device. This leads in top view to virtually an overlapping or at least partially overlapping or adjacent arrangement of spring unit and damper unit being possible, and therefore the construction width in the transverse direction of the axle device is reduced. At the same time, however, the advantages achievable by the separation of the spring unit from the damper unit in comparison to combined spring-damper units are achieved. An improved and safer spring and damper behavior can therefore be achieved without impairing the space required in the transverse direction. The vehicle can therefore be provided with a smaller width, and/or the space between the wheel carriers can be used with greater flexibility. It is also possible to use greater wheel widths or tire widths in the same vehicle width.

However, by means of the spacing of spring portion and damper portion in the direction of travel, a rotational force or a torsion arises during the inward deflection and damping, and during the outward deflection and damping of the outward deflection movement. In order to be able to absorb said torsion in the supporting link by means of the lever arm in the direction of travel, in the case of the configuration according to aspects of the invention of the supporting link the body portion is provided with a torsion support portion. By means of the movement stiffness thereof in the vertical direction, this makes it possible to absorb and to support said torsion both upward and downward. Torsion of the supporting link or of the entire axle device is therefore significantly reduced and can be supported by means of a separate force introduction point on the torsion portion on the body. In order, despite said support of the undesirable torsion, to avoid an overdetermination of the link system of the axle device, the torsion portion is, however, provided with movement freedom in the two other axial directions, i.e. in the direction of travel and in the transverse direction of the body. The advantages of separating spring unit and damper unit while the space required in the transverse direction of the body is reduced can therefore be achieved without additional force transmissions or additional torsion problems occurring in the link system of the axle device.

It can be of advantage if, in the case of an axle device according to aspects of the invention, the torsion portion is designed as a coupling portion. This is a lightweight and cost-effective configuration of the torsion portion. Said coupling portion is preferably also supplied as a multi-part coupling portion with two or more individual coupling arms. The use of a coupling portion makes it possible here to avoid an articulated connection to the body, and therefore in particular a non-articulated or articulation-free coupler is provided as the coupling portion for the torsion support portion.

The axle device according to the above paragraph can afford advantages if the torsion support portion in the form of the coupling portion has a movement clearance in the transverse direction and in the direction of travel of the body. Said clearance differs in particular from a lack of movement clearance in the vertical direction, and therefore corresponding support of torsion forces is possible both upward and downward in the vertical direction. The movement clearance precisely specifies the two degrees of freedom in relation to an overdetermination, as are intended to be provided in the torsion support portion according to the core concept of the present invention.

It can be a further advantage if, in the case of an axle device according to aspects of the invention, the torsion support portion has a bearing portion with bearing degrees of freedom in the direction of travel and in the transverse direction of the body. It is therefore also possible if the torsion support portion has a corresponding bearing device for the connection to the body. In order, however, also to avoid an undesirable mechanical overdetermination of the bearing here, bearing degrees of freedom which can be ensured, for example, by corresponding clearances on the bearing portion are predetermined in the direction of travel and in the transverse direction.

In the embodiment of the preceding paragraph, advantages are afforded if, in the case of the axle device, the torsion support portion in the form of the bearing portion for forming the bearing degrees of freedom has mechanical softness, in particular elasticity in the direction of travel and/or in the transverse direction of the body. Such a mechanical softness can be ensured, for example, by elastic components or rubber parts. In addition to the reduction of the bearing determination, protection against vibrations or a reduction of vibrations is thereby possible since vibrations can be damped, as it were, by said mechanical softness. As freedom length for the length degrees of freedom, the mechanical softness is preferably configured over a length range of approximately 10 mm.

It can likewise be of advantage if, in the case of an axle device according to aspects of the invention, the supporting link has a line of dynamic effect along which the force is transmitted between the wheel carrier and the body, wherein the spring portion and the damper portion are arranged on different sides of the line of dynamic effect. The supporting link therefore serves to transmit the force along said line of dynamic effect, which can also be understood as or called a physical force path, into the body. The arrangement of spring portion and damper portion on different sides of said line of dynamic effect reduces the torsion which arises on the supporting link during the inward deflection and during the outward deflection. Owing to the fact that, for the torsion, ultimately the lever arm between the line of dynamic effect and the spring portion or the damper portion is crucial, the lever arm is formed with different signs by means of the arrangement of said two portions on different sides of the line of dynamic effect. The rotational force which arises or the resulting torsion from spring portion and damper portion is therefore at least partially mutually eliminated, and the resulting overall torsion can thereby be significantly reduced.

It is advantageous, in the case of the embodiment according to the preceding paragraph, if, in the case of the axle device, the distance of the spring portion from the line of dynamic effect corresponds or substantially corresponds to the distance of the damper portion from the line of dynamic effect. The torsion which arises can therefore be minimized or can even be entirely avoidable if said two distances are identically configured. It is therefore possible to reduce the mechanical formation of the coupler or of the torsion support portion and at the same time to minimize the mechanical load, and therefore weight and space requirement can be improved and the service life extended.

It can be a further advantage if, in the case of an axle device according to aspects of the invention, the torsion support portion has a connection arm for the connection to the body. The connection arm here can preferably be connected fixedly and in a force-fitting manner to the body and can have a corresponding counterbearing, a counterbearing portion or a countercoupler portion in order to be able to ensure the corresponding support of the torsion portion. A corresponding height offset with respect to the connection to the body can be compensated for via the connection arm, and therefore an additional lever arm in said vertical direction is avoidable or at least pre-determinable in a defined manner.

It is furthermore of advantage if, in the case of an axle device according to the invention, the body portion of the supporting link also has, in addition to the torsion support portion, at least one fastening portion for the fastening to the body. This is preferably a statically determined fastening to the fastening portion which is formed without a degree of freedom, or with a definition in the transverse direction, vertical direction and in the direction of travel of the body.

The present invention furthermore relates to a vehicle with a body with at least two axles. At least one axle is in each case equipped with at least one axle device according to the present invention on both sides of the body. By means of the use of at least one axle device according to aspects of the invention on both sides of each axle, a vehicle according to aspects of the invention affords the same advantages as have been explained in detail with respect to an axle device according to aspects of the invention. The axle which is equipped with the axle devices according to aspects of the invention is preferably a driven axle of the vehicle.

BRIEF DESCRIPTION OF THE DRAWING

Further advantages, features and details of the invention emerge from the description below in which exemplary embodiments of the invention are described in detail with reference to the drawings. Schematically in the drawings.

DETAILED DESCRIPTION OF THE INVENTION

Figure 1:
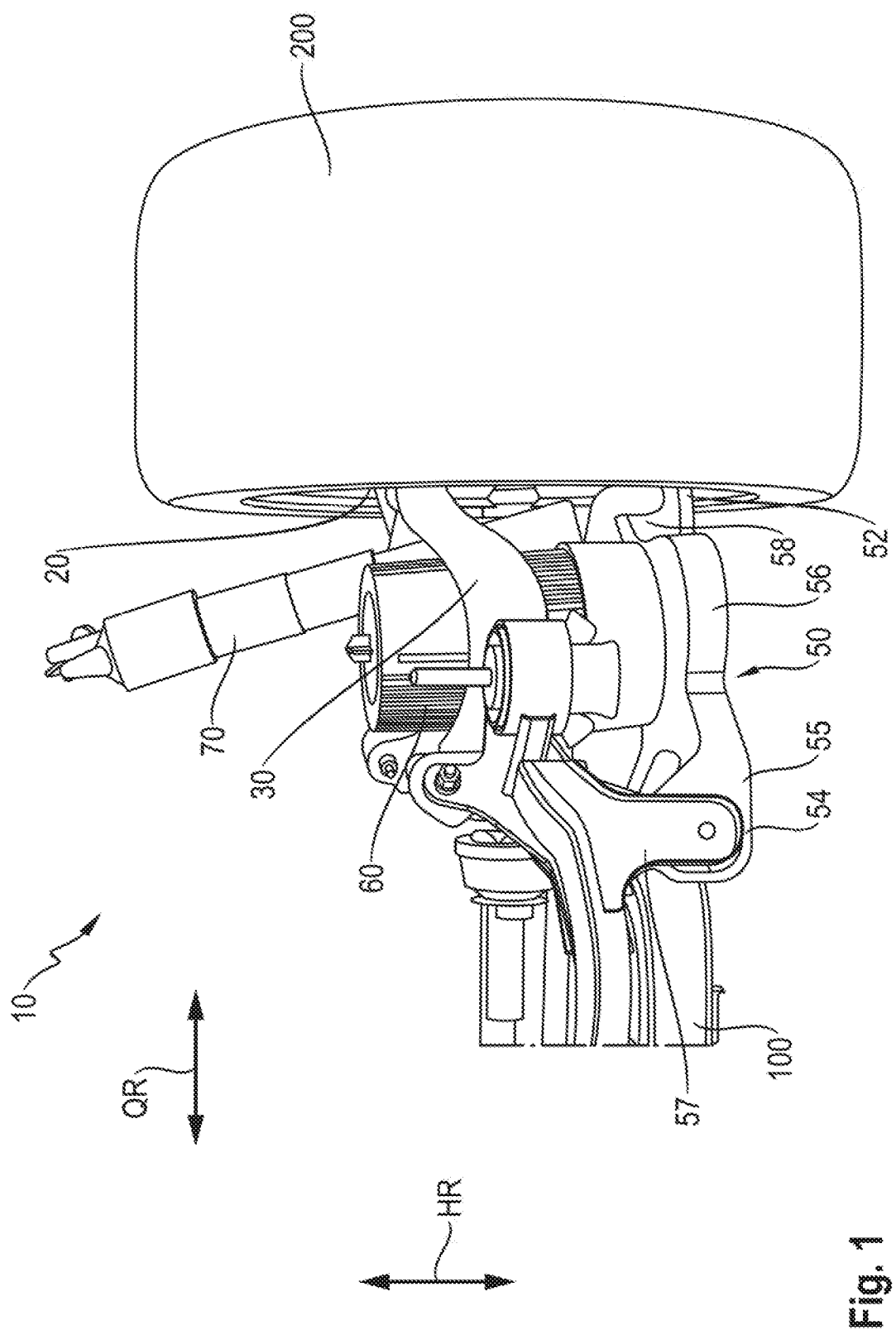
FIG. 1 shows an embodiment of an axle device according to aspects of the invention.
Figure 2:
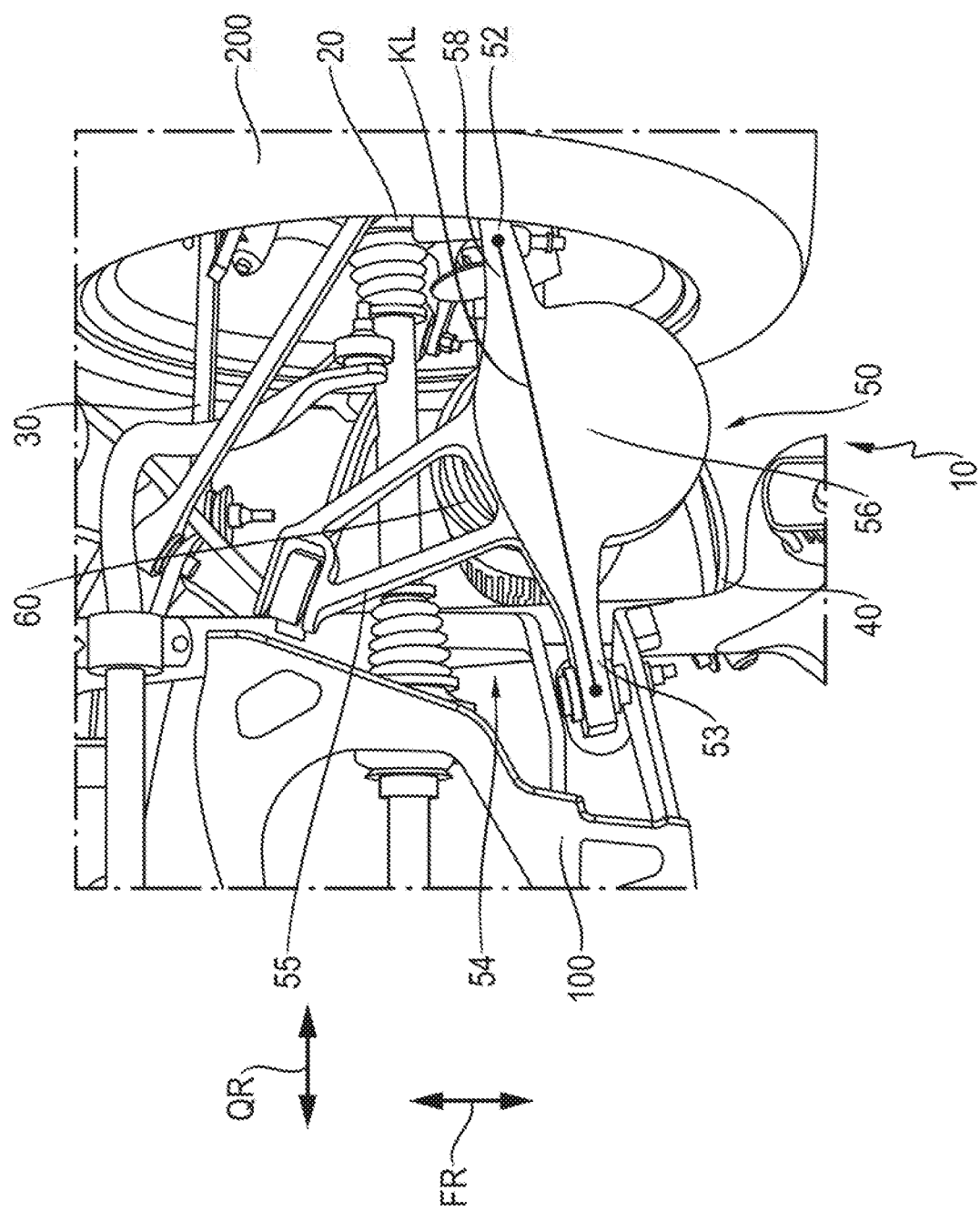
FIG. 2 shows the embodiment of FIG. 1 in a bottom view.

FIGS. 1 and 2 show a first embodiment of the axle device 10. The latter is substantially configured here with a first link 30 and a second link 40, which links extend in a force-transmitting manner between the wheel carrier 20 and the body 100. The wheel 200 is connected here to the wheel carrier 20 and is fastened in a manner free from rotation. For inward deflection and outward deflection in a damped manner, a spring unit 60 and, separately from the latter, a damper unit 70 are provided. In order to be able to ensure a transmission of force to spring unit 60 and damper unit 70, the axle device 10 here is configured as a multi-link system with a carrier link 50. Said carrier link 50 likewise extends in a force-transmitting manner between the wheel carrier 20 and the body 100.

As FIGS. 1 and 2 readily show, the supporting link 20 is connected to the wheel carrier 20 in a force-transmitting manner via a carrier portion 52. If the supporting link 50 is now followed in the transverse direction QR of the body 100 to the left in FIG. 1 and FIG. 2, i.e. inward with respect to the body 100 from the wheel 200, first of all from the carrier portion 52 a damper portion 58 is arrived at which serves for arranging and fastening the damper unit 70. Further inward in the transverse direction, the spring portion 56, which here accommodates the spring unit 60, follows in a manner correspondingly offset in the transverse direction QR. For the connection and support of the forces of the wheel carrier 20, the damper unit 70 and the spring unit 60, a fastening portion 53 is provided here in order to transmit the force into the body 100.

In addition to the offset or the spacing between damper portion 58 and spring portion 56 in the transverse direction QR, an offset or a spacing in the direction of travel FR can readily also be seen according to FIG. 2. If a transmission of force takes place on the damper portion 28 and the spring portion 26, said lever arms are formed around the line of dynamic effect KL according to FIG. 2. Said two lever arms are oriented differently on different sides of the line of dynamic effect KL, and therefore the torsion which arises is at least partially mutually eliminated. However, the resulting residual torsion has to be supported on the body 100 via the supporting link 50. In order to avoid the introduction of the torsion force on the fastening portion 53, a torsion support portion 55 is therefore additionally provided here on the body portion 54. Said torsion support portion 55 is configured as a coupler portion in the embodiment of FIGS. 1 and 2 and forms a fastening stiffness in the vertical direction HR in order to support said resulting residual torsion. In order to avoid overdetermination of the link system of the axle device 10, said coupler portion of the torsion support portion 55 is, however, configured with fastening freedom in the transverse direction QR and in the direction of travel FR.

Figure 3:
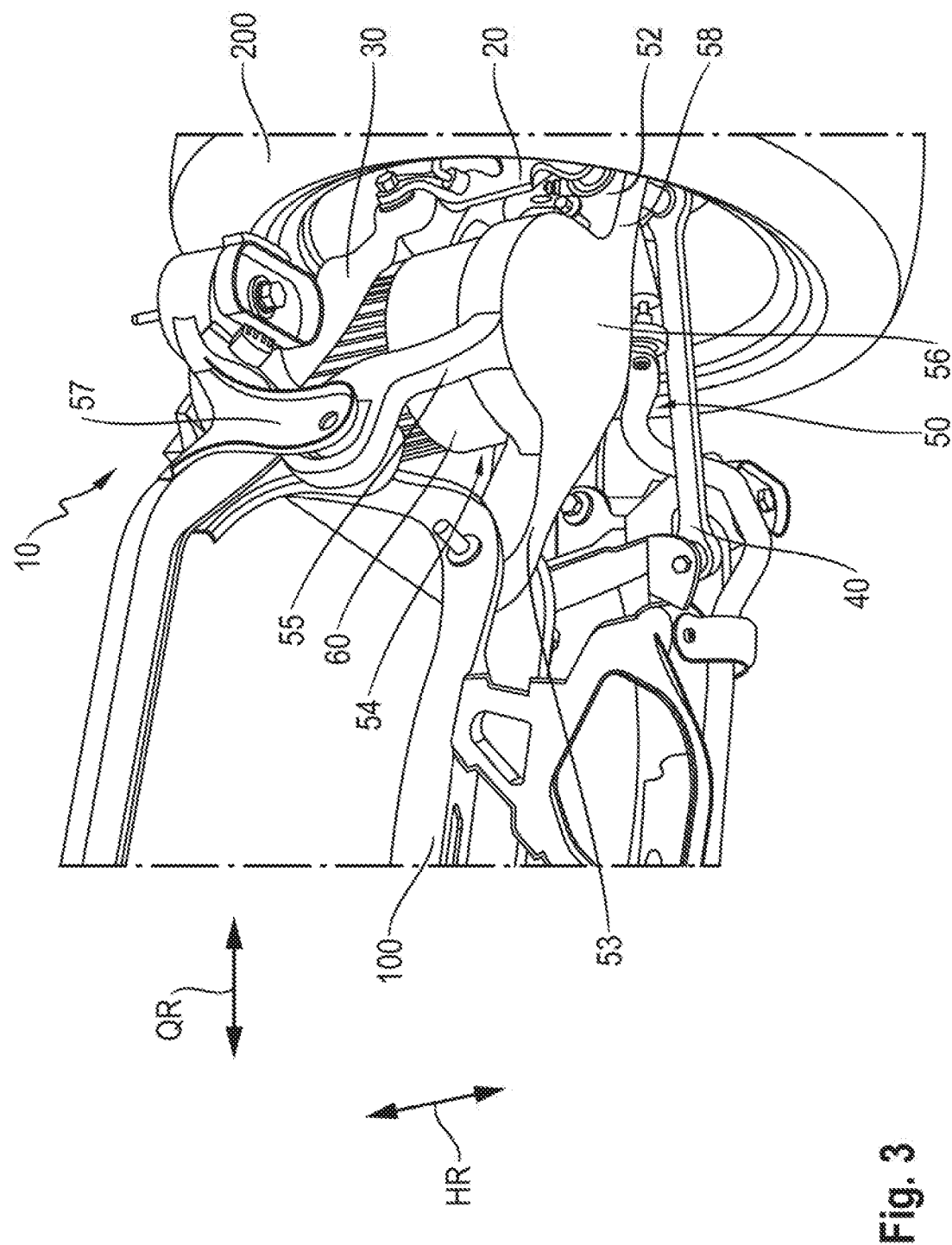
FIG. 3 shows a further embodiment of an axle device according to aspects of the invention.
Figure 4:
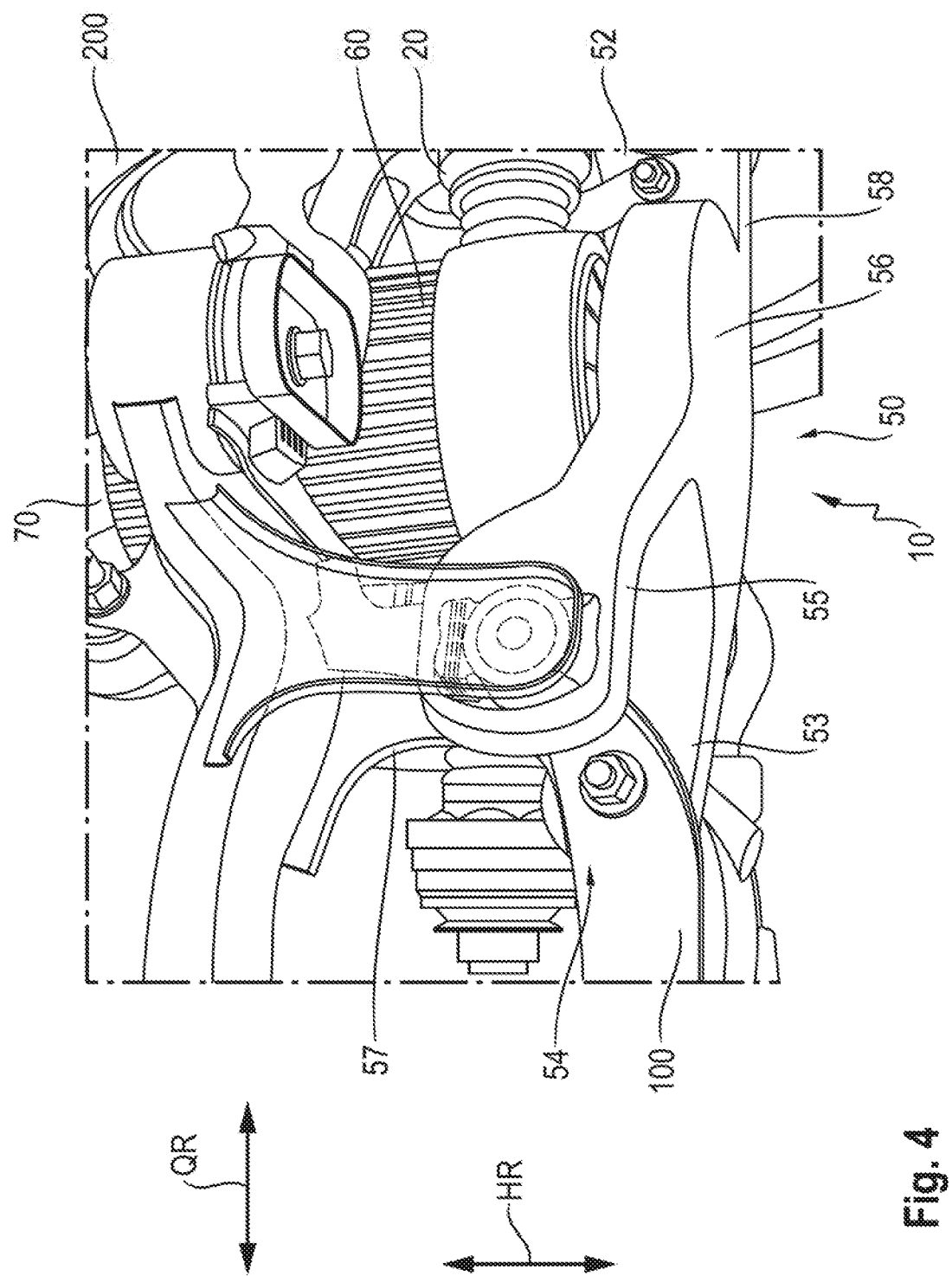
FIG. 4 shows the embodiment of FIG. 3 in a detailed illustration.

FIGS. 3 and 4 show a similar embodiment of the axle device 10, wherein here, however, the body portion 54 has the torsion support portion 55 in the form of a bearing support portion. Said bearing has corresponding degrees of bearing freedom in the transverse direction QR and in the direction of travel FR, which bearing degrees of freedom can be ensured, for example, by the mechanical softness of corresponding rubber components. In order to be able to compensate for an offset in the vertical direction HR, in the two embodiments, i.e. in FIGS. 1 and 2, as also in FIGS. 3 and 4, a connection arm 57 is provided which has the corresponding coupling connection or the corresponding bearing connection.

The above explanation of the embodiments describes the present invention exclusively within the scope of examples. Of course, individual features of the embodiments, if technically expedient, can be freely combined with one another without departing from the scope of the present invention.

What is claimed is:

1. An axle device for connecting a wheel to a body of a vehicle, the axle device comprising:
   a wheel carrier configured to be fastened to the wheel,
   a first link and a second link for force-transmitting connection to the body, which links are each connected to the wheel carrier,
   a supporting link with a carrier portion, which is connected to the wheel carrier, and with a body portion for force-transmitting connection to the body, wherein the supporting link has a spring portion for supporting a spring unit and a damper portion for supporting a damper unit, which spring portion and damper portion are spaced apart from each other in a direction of travel of the body,
   wherein the body portion of the supporting link has a torsion support portion with fastening freedom in the direction of travel of the body and in a transverse direction of the body and with fastening stiffness in a vertical direction of the body.

2. The axle device as claimed in claim 1, wherein the torsion support portion is configured as a coupling portion.

3. The axle device as claimed in claim 2, wherein the torsion support portion in the form of the coupling portion has a movement clearance in the transverse direction and in the direction of travel of the body.

4. The axle device as claimed in claim 1, wherein the torsion support portion has a bearing portion with bearing degrees of freedom in the direction of travel of the body and in the transverse direction of the body.

5. The axle device as claimed in claim 4, wherein the torsion support portion in the form of the bearing portion for forming the bearing degrees of freedom has elasticity in the direction of travel or in the transverse direction of the body.

6. The axle device as claimed in claim 1, wherein the supporting link has a line of dynamic effect along which the force is transmitted between the wheel carrier and the body, wherein the spring portion and the damper portion are arranged on different sides of the line of dynamic effect.

7. The axle device as claimed in claim 6, wherein a distance between the spring portion and the line of dynamic effect corresponds or substantially corresponds to a distance between the damper portion and the line of dynamic effect.

8. The axle device as claimed in claim 1, wherein the torsion support portion has a connection arm for the connection to the body.

9. The axle device as claimed in claim 1, wherein the body portion of the supporting link also has, in addition to the torsion support portion, at least one fastening portion for fastening to the body.

10. A vehicle with the body and at least two axles, wherein at least one axle has one of said axle devices according to claim 1 on each side of the body.

* * * * *